United States Patent Office 2,865,878
Patented Dec. 23, 1958

2,865,878

AQUEOUS COATING COMPOSITIONS, ARTICLES COATED THEREWITH, AND METHODS FOR PRODUCING THEM

Frederick W. Toothill, Jr., Abington, and Joseph A. Stieber and Harold L. Hatton, Philadelphia, Pa., assignors to Rohm & Haas, Philadelphia, Pa., a corporation of Delaware No Drawing. Application September 26, 1955
Serial No. 536,743

20 Claims. (Cl. 260—29.6)

This invention relates to novel compositions of matter that are adapted to serve as coating compositions and binder media, whether clear or pigmented. It is particularly concerned with a novel combination of a polymeric film-forming material with a compatible plasticizer therefor which is adapted to form a tough, non-tacky pigmented film on drying, and is also adapted to provide an outstanding pigment vehicle or pigment-dispersing medium. It is more particularly concerned with an aqueous dispersion of a compatible combination of (1) a salt of a copolymer from maleic anhydride with an olefin and (2) a phenol derivative of certain type which apparently serves to plasticize the copolymer salt. It is also concerned with methods of producing pigment dispersions using a combination of the polymeric film-forming material and the plasticizer, particularly a preferred embodiment in which they are employed in the presence of small amounts of water and form a tough, taffy-like composition adapted to work most efficiently in dispersing a pigment.

It is an object of the present invention to provide an aqueous dispersion of a novel combination of a polymeric film-forming material with a compatible plasticizer that is adapted to serve per se as a coating composition or as a dispersant or binder medium for pigments. An ancillary object is to provide such a combination of a film-forming material and plasticizer which is adapted to form a wide range of viscosities depending on the amount of water used including the formation of an extremely viscous, tough plastic medium for assisting in the dispersing of a pigment when a mixture of the pigment and plastic medium is subjected to shear. A further object is to provide such a combination of film-forming agent and plasticizer therefor which is adapted to be converted from the aforementioned extremely viscous condition into a relatively highly fluid condition by the addition of a relatively small amount of a solvent diluent after the pigment has been worked into the mass for the purpose of facilitating the removal of the dispersion from mixing equipment and the like. Other objects and advantages of the invention will be apparent from the description thereof hereinafter.

It is already known to utilize 1:1 molar copolymers of maleic anhydride with styrene in their salt form as dispersants for pigments. Generally, a pigment is worked into an aqueous solution of such a salt, which is of relatively low viscosity, and the pigment dispersion thereby obtained is subsequently diluted to the extent necessary to provide the concentration desired for use. An aqueous dispersion of such a salt in high concentrations may also be used for dispersing a pigment but such concentrated dispersions are generally no more rapid in their dispersing action on the pigment than relatively dilute, low-viscosity dispersions thereof. In addition, the use of such highly concentrated dispersions gives rise to difficulties in removing the pigment dispersion obtained from the mixer so that they are generally not used.

In accordance with the present invention, the novel composition comprises a salt of a linear copolymer from maleic anhydride and a branched-chain unsaturated hydrocarbon including mono-olefins and unsaturated terpene types having 4 to 10 carbon atoms, the hydrocarbon and maleic anhydride being combined in approximately 1:1 molar ratio and the copolymer having an average molecular weight from 500 to about 5000 and, in addition to this salt, a water-insoluble ethylene oxide condensate, or methyl or ethyl ethers thereof, of a higher alkylphenol in which the alkyl group has from 8 to 18 carbon atoms and is preferably of branched-chain character and the condensate contains from one to five oxyethylene units in the molecule.

The salt of the copolymer is obtained by adding to an aqueous dispersion of the copolymer ammonium hydroxide or a volatile water-soluble amine, such as methylamine, dimethylamine, triethylamine, ethylamine, diethylamine, isopropylamine, morpholine, piperidine, pyrrolidine, and so on. The salts thus obtained are sometimes referred to herein simply as ammonium or amine salts even though, as is well known, salt groups may not be the only groups formed. The mono-olefins may be isobutylene, isoamylene, branched-chain hexenes, and diisobutylene of the formula

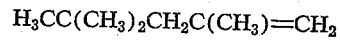

$$H_3CC(CH_3)_2CH_2C(CH_3)=CH_2$$

and the terpenes may be dipentene, limonene, terpineol, and dicyclopentadiene. The copolymers may be produced by conventional procedures such as by copolymerization in an organic solvent, such as xylene or dioxane, in the presence of an initiator, such as benzoyl peroxide, lauroyl peroxide, cumene hydroperoxide, t-butyl perbenzoate, or the like. The usual procedures for isolating the copolymer may be employed, such as removal of solvent and monomer by distillation or separation of the copolymer, when precipitated, by filtration. If desired, copolymers of substantial homogeneity may be obtained for use in the present invention either by controlling polymerization conditions or by suitable fractionation of a heterogeneous polymer obtained.

The water-insoluble ethylene oxide condensate of the higher alkylphenol may be that derived from alkylphenols in which the alkyl group may be n-octyl, dodecyl, tetradecyl, hexadecyl, or octadecyl. The alkyl group is preferably of branched-chain character, such as in the case of t-octyl having the formula

$$H_3CC(CH_3)_2CH_2C(CH_3)_2-$$

The methyl and ethyl ethers of these ethylene oxide condensates are also useful. The more hydrophobic condensates are preferred in that they are characterized by substantially complete freedom from foaming and a minimum sensitivity to water. Thus, those condensates having an average of 3 or less oxyethylene units are generally the most advantageous.

The proportions between the copolymer salt and the phenol derivatives may be from 1:2 to 5:2, the former ratio representing softer, highly flexible compositions and the latter harder, less flexible compositions. All of these proportions are suitable in compositions that are to be applied to substrates that are not subject to appreciable flexing actions, such as wood, glass, metal or fairly rigid plastic materials, but when these two-component compositions are to be applied to highly flexible bases such as leather, paper, textile fabrics, and plastic base having rubber-like flexibility, the higher proportions of copolymer salt are preferably avoided. For application to flexible bases, the ratio of copolymer salt to phenol derivative should not exceed about 45:35. Preferred ranges of compositions having an optimum combination of flexibility and toughness are those having the ratio of copolymer salt to phenol derivative between 55:65 and 45:35.

It has heretofore been suggested to employ copolymer salts of the type herein-used as dispersants for making pigment pastes. In such use, however, only a small proportion of the copolymer salt is present, being .3% or, more generally, less than 3% on the weight of the pigment. In such cases, the copolymer salt cannot serve as the binder for the pigment in any coating composition formed from the pigment paste, but the paste is compounded with an appropriate binder. It has elsewhere been suggested to use analogous copolymer salts alone as the film-forming component of aqueous coating compositions. However, these aqueous coating compositions are characterized by severe foaming and by the fact that many pigments on settling after standing tend to cake within the container and are difficult to redisperse, so that, in using such pigments, it is necessary to avoid prolonged storage of the aqueous compositions before use. Also, the coatings obtained when the copolymer salt is the sole film-forming component have poor resistance to wet-rubbing and frequently do not form a continuous film. In all cases the film is quite fragile.

The combination of copolymer salt and phenol derivative of the present invention is outstanding in respect to its ability to serve both as a film-forming binder, either alone or in admixture with other film-forming components, and as a pigment-dispersing medium. This combination has the advantages of casein without its disadvantages. Casein is still acknowledged to be an outstanding binder and dispersant for pigments in aqueous systems. It is inexpensive and abundant; it forms a hard film capable of forming films of widely varying hardness because of its compatibility with a wide variety of natural and synthetic film-forming polymeric materials, and because it can be plasticized with various materials, such as glycerine, glycols, and sulfonated vegetable oils. However, casein is subject to putrefaction and excessive foaming and requires great care in making solutions that are of proper quality, viscosity, and stability. Also pigments ground in aqueous casein dispersions tend to cake on settling and are difficult to redisperse. Unless an indurating agent, such as formaldehyde or an alum is used, films obtained are not resistant to wet-rubbing. The treatment with such agents, however, involves an extra operation, impairs the stability of the aqueous dispersion if added thereto too far in advance of use, and entails a certain amount of embrittlement and loss of clarity in the film.

The combination of copolymer salt and phenol derivative of the present invention, however, is free of excessive foaming and free of putrefactive tendencies. Films therefrom can be varied over a wider range of hardness even than those from casein. This variation is effected without the aid of a water-soluble plasticizer so that the resistance to wet-rubbing of the films is not impaired. While the aqueous dispersions of the present invention wet the surfaces to be coated rapidly and have outstanding flow properties during application, the films obtained have excellent wet-rub resistance and are readily recoated without being damaged thereby, as by removal or undue swelling.

In preparing the aqueous coating composition of the present invention, the phenol derivative may be added to an aqueous solution or dispersion of the copolymer salt directly after its production, that is, the phenol derivative may be added to the aqueous dispersion obtained from the copolymedization of the maleic anhydride and the olefin. The copolymer may be converted to the salt by the addition of ammonium hydroxide or an amine of the type mentioned hereinabove, either before or after the introduction of the phenol derivative. The concentration of the copolymer salt in the polymer dispersion may be from 25% to 70% by weight and is preferably about 35% to 50% by weight for most pigments.

In making pigmented dispersions, the pigment may be worked into the aqueous dispersion containing the copolymer salt and the phenol derivative in concentrations of 5% to 55% solids (exclusive of pigment) in such devices as a ball mill, rod mill or the like in a period of 4 hours to a week depending on the quality of dispersion desired. However, a preferred method involves the working of the pigment into a medium comprising the copolymer salt, phenol derivative, and a small amount of water and having a highly viscous to plastic condition by means of an intensive or shear-type mixer. If the aqueous copolymerization medium after neutralization to form the salt and the addition of the phenol derivative is of inadequate viscosity and it is desired to work up the pigment in the preferred highly viscous to plastic system, the proportion of water in the system should be adjusted either by evaporation thereof or by the addition of either the phenol derivative or the copolymer salt, or a mixture of both to provide a viscous to plastic medium. Generally, this highly viscous condition exists when the composition is made from a copolymer salt dispersion having a concentration of about 25% to 70% in water, and no special step of concentration is needed to attain it.

The phenol derivative is quite compatible with the copolymer salt and apparently serves to plasticize it. In the presence of the amount of water specified in the preceding paragraph, the combination of the copolymer salt with the phenol derivative produces a tough, rubbery or taffy-like consistency which is extremely efficient in dispersing the pigments when the mass is introduced with the pigments into shear-type mixers, such as a Werner-Pfleiderer comprising a pair of sigma blades one of which operates faster than the other, or onto a two-roll or three-roll differential speed roll stand, such as are used in the rubber industry.

Because of the plastic or highly viscous nature of the composition in the preferred method of operation, the pigments are rapidly and thoroughly dispersed to produce a composition in which the pigment is substantially uniformly distributed throughout without the presence of agglomerates or specks. The highly viscous composition thereby obtained may be used as such to coat substrates of various materials, such as wood, glass, metals, paper, leather, textile fabrics, felts, and the like, or they may be diluted to any concentration before coating such a substrate. The compatibility of the phenol derivative with the copolymer salt is such that, on drying the composition after coating such substrates, a hard, tough film is obtained.

One of the advantages of the composition of the present invention is that the pigment dispersion obtained by the preferred method may be very easily reduced to a highly fluid condition in the mixing equipment simply by the addition of a small percentage of a water-soluble alcohol, such as from ½% to 5% thereof based on the entire weight of the dispersion. The alcohols that may be used include the water-soluble alcohols, such as methanol, ethanol, isopropanol, and 2-ethoxyethanol. The small amounts of alcohol that may be used for thinning the composition to aid removal from the mixing equipment do not in any way impair the utility of the pigment dispersion for coating or other purposes. In fact, in many instances, the alcohol actually improves the compatibility of the composition and the flow characteristics thereof.

Any suitable pigment or insoluble dyestuff may be dispersed by the procedure of the present invention. The proportion thereof may vary widely from 1% to 300% by weight or more based on the weight of the copolymer salt so as to provide a pigment to binder ratio of 1:2 to 4:1. Examples of pigments including extenders that may be so dispersed include white lead, zinc oxide, titanium pigments, lithopone, other zinc sulfide pigments, barium sulfate, calcium carbonate, silica, talc, mica, and clays, such as china clay. Pigment pastes normally comprise one or more of these or equivalent pigments. There may be added one or more insoluble inorganic or organic colors, such as an iron oxide, carbon black, cadmium sulfide, toluidene red, lithol toner, maroon toner, chrome orange, chrome yellow, Hansa yellow, chrome green, phthalocyanine green, phthalocyanine blue, etc.

The term "pigment" is here used to cover a powder or powdered substances which are mixed with liquids to form paints, enamels, other coating compositions, or the like, which are insoluble therein, and which provide covering, hiding, filling, and/or coloring action. Since aqueous suspensions or dispersions of pigments are here dealt with, it is necessary that the dispered pigments be insoluble in water. They are, of course, in the finely divided forms which are provided in commerce. Pigments are frequently ground or precipitated in a form to pass a 325-mesh screen.

When a substantial amount of a hydrophobic pigment, such as Hansa yellow, maroon toner, and carbon black, is used, a small amount of a water-soluble wetting agent may be used, such as a sulfated higher alcohol; e. g., sodium lauryl sulfate, a sulfonated alkylbenzene, such as sodium dodecylbenzene sulfonate, or a sulfonated or unsulfonated higher alkylphenoxypolyethoxyethanol containing 8 to 18 carbon atoms in the alkyl group and an average of 7.5 to 50 oxyethylene units.

Not only are the dispersions obtained above useful directly, with or without dilution with water, for coating purposes, but they may be mixed with other binders, either in aqueous or organic solvent medium. They are especially useful for incorporation with aqueous solutions or dispersions of addition polymers or copolymers of esters of acrylic or methacrylic acid with alcohols having 1 to 18 carbon atoms, such as methyl, ethyl, isopropyl, n-butyl, isobutyl, t-butyl, amyl, hexyl, cyclohexyl, octyl, t-octyl, decyl, dodecyl, hexadecyl, and octadecyl alcohols. Such esters may be copolymerized, as by emulsion copolymerization, with or without such monoethylenically unsaturated comonomers as styrene, ethylene, isobutylene, acrylonitrile, methacrylonitrile, vinyl acetate, vinyl chloride, vinylidene chloride, etc. Especially useful additions are the aqueous solutions or dispersions of ammonium, alkali metal, or lower amine salts of copolymers of acrylic, methacrylic, itaconic, maleic, or fumaric acids with esters of any of such acids, or with any of the comonomers mentioned above. These latter copolymers may comprise from about 3 mol percent to about 60 mol percent of the acid or salt component, generally being about 50 mol percent in the case of maleic or fumaric acids and in any proportion within the 3 to 60 mol percent range in the case of acrylic, methacrylic and itaconic acids. The amines used to make the salts may be any one or a mixture of two or more of the following: Methylamine, dimethylamine, trimethylamine, ethylamine, diethylamine, triethylamine, isopropylamine, morpholine, monoethanolamine, 2-amino-2-methylpropanol-1, piperidine, pyrrolidine, etc.

Coating compositions of or comprising the dispersions of the present invention, with more or less dilution and with or without other binders, may be applied to any substrates to be coated by any suitable means including dipping, roller coating, application by brushes and, most important of all, by spraying. After application, the coated substrate is dried either in the atmosphere at normal temperatures or preferably at elevated temperatures such as from 60° to 100° C. or higher depending upon the substrate and the time available in case of machine operations.

The coating on the substrate obtained from the composition of the present invention is essentially a mixture of the several components described hereinabove except that the copolymer salts are substantially converted into free acid and/or amide, and/or imide form as the result of the volatilization of ammonia or amine. The composition may be applied to a wide variety of substrates and has excellent adhesion thereto, such as leather, floors, woodwork, furniture, paneling, automobile bodies, and all sorts of metals and wood surfaces. It may also be applied to fabrics, such as for the purpose of producing a permanent finish as in the case of loom sizes or as top coatings for artificial leather or oil cloth, also to linoleum, asphalt tile, and other fabricated structures. It is also useful for coating such porous substrates as paper and cardboard, which are extremely flexible, or for such porous substrates as stone, cement, or concrete. In all such applications, the composition of the present invention may be applied to previously coated surfaces as well as to those that have not been previously coated. Thus, in application to leather products, the composition of the present invention is extremely valuable as a top dressing for shoes or garment leathers which have previously been finished with colored finishes of either waterbase or lacquer type.

The coating compositions are characterized by little or no foaming, good wettability and spreadability, in many cases having the same type of flow that is characteristic of lacquer types of coating compositions, which is an outstanding property for an aqueous system. In respect to the coating of leathers, gloss is obtained without a glazing operation. However, while glazing would be unsuitable for modifying a coated leather obtained by the present invention, the coated leather or other products may be treated by a plating operation, wherein the coated surface is pressed without rubbing against a smooth, hot surface such as of a polished metal plate. In addition, there is no need for subsequent treatment with hardening agents, such as formaldehyde or alums, the coating composition being of adequate water-resistance for normal purposes on mere drying thereof. The flexibility of the coating composition is of permanent character, there being no permanently water-soluble plasticizer, such as glycerine, employed.

In the following examples, illustrative of the invention, the parts given are by weight unless otherwise noted:

Example 1

An aqueous solution of a 50:50 mol ratio copolymer from maleic anhydride and diisobutylene is neutralized with ammonium hydroxide to produce a 30.5% concentration of the copolymer salt and then 221 parts of the solution is agitated continuously while 22 parts of t-octylphenoxyethanol is added. The resulting composition is diluted to 15% solids concentration and is sprayed as a clear finish coat on a pair of leather shoes and dried in heated air at 210° F. for five minutes. The shoes thereby acquire a glossy water-repellent finish.

Example 2

An aqueous solution of a 50:50 mol ratio copolymer from maleic anhydride and diisobutylene is neutralized with ammonium hydroxide to produce a 30.5% concentration of salt. Then 22.1 parts of the solution thereby obtained, 10.1 parts of t-octylphenoxyethanol, 1 part of triethanolamine, 21.8 parts of water, and 45 parts of molybdate chrome orange pigment are introduced into a ball mill and ground therein for 48 hours. The resulting pigment dispersion is homogeneous, well dispersed, and has good storage stability.

It adheres well to wood panels, paper, glass, and to many other porous and non-porous surfaces. It sets rapidly, on the order of about 1 to 5 minutes, but does not attain its fully dried condition for some time afterward.

Example 3

The procedure of Example 2 is repeated with 33.4 parts of a 30.5% aqueous solution of the ammonium salt of the copolymer of Example 2, 7.4 parts of t-octylphenoxyethanol, 4.1 parts of t-octylphenoxypolyethoxyethanol having an average of 12.5 oxyethylene units, 0.8 part of triethanolamine, 10 parts of maroon toner, and 44.3 parts of water. The pigment is well dispersed and coatings on the substrates mentioned exhibit good wet-rub resistance in spite of the presence of a small proportion of a water-soluble phenol derivative,

Example 4

The procedure of Example 2 is followed with 27.9 parts of the 30.5% aqueous solution of the ammonium salt of the copolymer of Example 2, 8.5 parts of t-octylphenoxypolyethoxyethanol having three oxyethylene units, 34 parts of medium cadmium red and 29.6 parts of water. The pigment is well dispersed. The coatings on various substrates, including leather, adhere tenaciously, are resistant to wet-rubbing, and on recoating with a second application of the same pigmented dispersion are undamaged by such subsequent coating operations.

Example 5

A mixture of 6.2 parts of a 34.1% aqueous solution of the ammonium salt of the copolymer of Example 2, 2.1 parts of t-octylphenoxypolyethoxyethanol having 5 oxyethylene units, 40 parts of titanium dioxide, and 51.7 parts of water is passed twice through a colloid mill. The white pigment dispersion is coated on leather, paper, and wood substrates and the coatings show excellent adhesion and wet-rub resistance.

Example 6

(a) There are introduced, with continuous agitation, into an intensive type of mixer of the Werner-Pfleiderer type 774 parts of the 30.5% aqueous solution of the ammonium salt of the copolymer of Example 2, 204 parts of t-octylphenoxyethanol, and 200 parts of t-octylphenoxypolyethoxyethanol having an average of three oxyethylene units. After 5 to 10 minutes of blending into a substantially homogeneous mixture, there is gradually added over a period of about 10 to 15 minutes with continued agitation 1600 parts of iron oxide brown. It is reduced in viscosity by the addition of 1220 parts of water with continued agitation to provide a sprayable composition and then removed from the mixer and coated on various substrates including leather. On drying, the coatings exhibit excellent adhesion and wet-rub resistance, especially on leather.

(b) In a second run of the procedure of part (a) hereof, 138 parts of ethanol are added instead of the 1220 parts of water. This renders the composition readily removable and of sprayable consistency. Coatings on leather, wood, metals, and so on exhibit good adhesion and wet-rub resistance.

Example 7

An aqueous solution of a 50:50 mol ratio copolymer from maleic anhydride with isobutylene is neutralized with triethylamine to produce a 25% solution of the copolymer salt. Then 500 parts of the solution is agitated continuously in a blender while 45 parts of dodecylphenoxyethoxyethanol are gradually added. A viscous composition is obtained which is coated on leather and provides an adherent, water-repellent, and washable protective film on the leather.

Example 8

An aqueous solution (300 parts) containing 15% of the piperidine salt of the 50:50 mol ratio copolymer from isoamylene with maleic anhydride is introduced into a mixer and 10 parts of the methyl ether of t-octylphenoxypolyethoxyethanol having an average of five oxyethylene units is added while agitation is continued.

This composition is applied by spraying to leather, paper, and wood surfaces. The coatings are well adhered and are resistant to wet-rubbing.

Example 9

The procedure of Example 2 is repeated except that the solution of the copolymer salt there-used is replaced with 25 parts of a 28% aqueous solution of the ammonium salt of a 50:50 mol ratio copolymer from maleic anhydride and dicyclopentadiene. The pigment is well dispersed into a stable dispersion. The coatings on leather, wood, and paper exhibit excellent adhesion and wet-rub resistance.

Example 10

The procedure of Example 2 is repeated except that the solution of the copolymer salt there-used is replaced with 25 parts of a 28% aqueous solution of the ammonium salt of a 50:50 mol ratio copolymer from maleic anhydride and dipentene. The pigment is well dispersed into a stable dispersion. The coatings on leather, wood, and paper exhibit excellent adhesion and wet-rub resistance.

It is to be understood that changes and variations may be made without departing from the spirit and scope of the invention as defined in the appended claims.

We claim:

1. An aqueous composition comprising (1) a water-soluable salt of an approximately 1:1 mol ratio linear copolymer of maleic anhydride and a branched-chain unsaturated hydrocarbon of 4 to 10 carbon atoms selected from the group consisting of aliphatic mono-olefins and unsaturated terpenes, said salt being obtained by the addition to the aqueous copolymer dispersion of a substance selected from the group consisting of ammonium hydroxide and volatile, water-soluble amines to neutralize acid-containing units in the copolymer and having an average molecular weight of about 500 to 5000, and (2) a water-insoluble ethylene oxide condensate of a higher alkylphenol containing an average of from one to five oxyethylene units and in which the alkyl group has 8 to 18 carbon atoms, the weight ratio of the copolymer salt to the condensate being from 1:2 to 5:2 and the total weight of the copolymer salt and condensate being at least 5% by weight of the aqueous composition.

2. An aqueous composition as defined in claim 1 in which the mono-olefin is isobutylene.

3. An aqueous composition as defined in claim 1 in which the mono-olefin is isoamylene.

4. An aqueous composition as defined in claim 1 in which the mono-olefin is diisobutylene.

5. An aqueous composition as defined in claim 1 in which the mono-olefin is dicyclopentadiene.

6. An aqueous composition as defined in claim 1 in which the mono-olefin is dipentene.

7. An aqueous composition as defined in claim 1 in which the condensate is t-octylphenoxyethanol.

8. An aqueous composition as defined in claim 1 in which the condensate is t-octylphenoxypolyethoxyethanol having an average of three oxyethylene units.

9. An aqueous composition as defined in claim 1 in which the condensate is t-octylphenoxypolyethoxyethanol having an average of five oxyethylene units.

10. An aqueous composition as defined in claim 1 in which the condensate is t-octylphenoxyethoxyethanol.

11. An aqueous composition as defined in claim 1 in which the condensate is dodecylphenoxyethoxyethanol.

12. A composition comprising an aqueous dispersion containing a water-insoluble pigment and a film-forming binder comprising (1) a water-soluble salt of an approximately 1:1 mol ratio linear copolymer of maleic anhydride and a branched-chain unsaturated hydrocarbon of 4 to 10 carbon atoms selected from the group consisting of aliphatic mono-olefins and unsaturated terpenes, said salt being obtained by the addition to the aqueous copolymer dispersion of a substance selected from the group consisting of ammonium hydroxide and volatile, water-soluble amines to neutralize acid-containing units in the copolymer and having an average molecular weight of about 500 to 5000, and (2) a water-insoluble ethylene oxide condensate of a higher alkylphenol containing an average of from one to five oxyethylene units and in which the alkyl group has 8 to 18 carbon atoms, the weight ratio of the copolymer salt to the condensate being from 1:2 to 5:2, the total weight of the copolymer salt and condensate being at least 5% by weight of the aqueous composition exclusive of pigment, and the weight ratio of pigment to binder being from 1:3.5 to 4:1.

13. A composition as defined in claim 12 in which the mono-olefin is diisobutylene.

14. A composition as defined in claim 12 in which the alkylphenol is t-octylphenol.

15. A coated article comprising a solid material base coated with a composition comprising (1) a water-soluble salt of an approximately 1:1 mol ratio linear copolymer of maleic anhydride and a branched-chain unsaturated hydrocarbon of 4 to 10 carbon atoms selected from the group consisting of aliphatic mono-olefins and unsaturated terpenes, said salt being obtained by the addition to the aqueous copolymer dispersion of a substance selected from the group consisting of ammonium hydroxide and volatile, water-soluble amines to neutralize acid-containing units in the copolymer and having an average molecular weight of about 500 to 5000, and (2) a water-insoluble ethylene oxide condensate of a higher alkylphenol containing an average of from one to five oxyethylene units and in which the alkyl group has 8 to 18 carbon atoms, the weight ratio of the copolymer salt to the condensate being from 1:2 to 5:2.

16. An article as defined in claim 15 in which the base is leather.

17. A method of producing a pigment dispersion which comprises preparing a composition comprising an aqueous dispersion of (1) a water-soluble salt of an approximately 1:1 mol ratio linear copolymer of maleic anhydride and a branched-chain unsaturated hydrocarbon of 4 to 10 carbon atoms selected from the group consisting of aliphatic mono-olefins and unsaturated terpenes, said salt being obtained by the addition to the aqueous copolymer dispersion of a substance selected from the group consisting of ammonium hydroxide and volatile, water-soluble amines to neutralize acid-containing units in the copolymer and having an average molecular weight of about 500 to 5000, and (2) a water-insoluble ethylene oxide condensate of a higher alkylphenol containing an average of from one to five oxyethylene units and in which the alkyl group has 8 to 18 carbon atoms, the weight ratio of the copolymer salt to the condensate being from 1:2 to 5:2 and the total weight of the copolymer salt and condensate being from 5% to 55% by weight of the aqueous composition exclusive of pigment, and agitating the dispersion while introducing a water-insoluble pigment until a substantially homogeneous dispersion is obtained.

18. A method as defined in claim 17 in which the agitation is accompanied by grinding.

19. A method as defined in claim 17 in which the agitation is effected by shear.

20. A method as defined in claim 17 in which about ½% to about 5%, based on the total weight of the dispersion, of a water-soluble alcohol is added to the pigment dispersion to facilitate removal thereof from the agitating equipment.

References Cited in the file of this patent

UNITED STATES PATENTS

| 2,386,764 | Zwicker | Oct. 16, 1945 |
| 2,490,677 | Cupery | Dec. 6, 1949 |
| 2,790,735 | McLaughlin et al. | Apr. 30, 1957 |

FOREIGN PATENTS

| 517,572 | Belgium | Aug. 11, 1953 |

OTHER REFERENCES

Concise Chemical and Technical Dictionary, edited by H. Bennett, Chemical Publishing Company, Inc. (1947), pages 493 and 952.